United States Patent Office 3,503,686
Patented Mar. 31, 1970

3,503,686
ATOMIC ABSORPTION SPECTROPHOTOMETER
Alan Walsh, Brighton, Victoria, and John Vincent Sullivan, Carnegie, Victoria, Australia, assignors to Commonwealth Scientific and Industrial Research Organization, East Melbourne, Victoria, Australia, a body corporate
Filed May 31, 1966, Ser. No. 553,806
Claims priority, application Australia, May 28, 1965, 59,466/65
Int. Cl. G01j *3/42;* G01n *21/00;* H01i *17/04*
U.S. Cl. 356—85                              3 Claims

ABSTRACT OF THE DISCLOSURE

An atomic absorption spectrophotometer utilizing a spectral lamp, a resonance lamp and photoelectric detector means wherein the resonance lamp is a multi-armed vapor generating tube which directs resonance radiation to the photoelectric detector means at right angles to the incident radiation from the spectral lamp.

---

The invention is concerned with new methods and apparatus having application in the techniques of atomic absorption spectrochemical analysis.

Techniques of spectrochemical analysis which make use of phenomenon of atomic absorption at specific wave lengths are well known and are described, together with the necessary components, both in the literature and in the applicant's Patent No. 2,847,899 and patent applications Ser. Nos. 314,350 now abandoned, 372,772 and 379,067 now abandoned.

Generally speaking, in such techniques, the sample is introduced as a solution into a flame where it is converted to an atomic vapor containing free atoms of its constituent elements. Light from an atomic spectral lamp having a spectrum characteristic of the element for which the analysis is being performed is passed through this atomic vapor. Atoms of this particular element in the flame absorb the incident radiation at specific wave lengths corresponding to certain of the atomic spectral lines (hereinafter termed the "resonance lines") characteristic of this particular element, the degree to which these lines are absorbed providing a precise indication of the concentration of the atoms of that element within the flame and, therefore, of the amount of that element contained in the sample. It is, of course, essential to employ a monochromator after the flame (in the direction of the incident radiation) in order to pass only the selected resonance line or lines to the detector (which is usually a photocell or photomultiplier) and to reject radiation at any other wave length emitted by the lamp or the flame. Furthermore, it is usual to reject by well known radiation modulation and A.C. amplification techniques any component of the photoelectric signals due to radiation emitted by the flame itself and passed by the monochromator along with the desired attenuated resonance line or lines derived from the atomic spectral lamp.

Now, the present invention is based on experiments which have determined that the monochromator—an essential and major item of conventional atomic absorption apparatus—can, in some cases, be elegantly and effectively replaced by a "resonance lamp" which will re-emit only the resonance line or lines characteristic of a given element upon being radiated with the entire spectrum of that element (or with a continuous spectrum containing wave lengths corresponding to the resonance lines), the intensity of the re-emitted resonance line or lines being strictly proportional to the intensity of the incident radiation at the same wave length or wave lengths. A suitable resonance lamp has already been described in our patent application No. 372,772, but the invention also envisages the use of other resonance lamps and, in particular, the use of resonance lamps in which the atomic gas or vapor is generated thermally, for example, by the thermal effects of an electric current. Since some confusion may arise from the fact that a number of different atomic vapors or gases are generated in the performance of the present invention, the atomic gas or vapor from which resonance radiation is re-emitted and detected will be hereinafter termed the "reference vapor or gas" and the atomic vapor or gas into which the substance to be analyzed is converted will be termed the "sample vapor or gas." This should, of course, be understood that the terms "sample" and "reference" are only used for the purpose of contradistinction and carry no other significance or limitation.

Basically, therefore, the present invention involves a method of spectrochemical analysis comprising the steps of: generating radiation at the wave length or wave lengths of the resonance line or lines characteristic of the element for which analysis is to be performed; generating a reference atomic vapor or gas of said element; directing said radiation onto the reference atomic vapor or gas; detecting the intensity of the radiation re-emitted by the reference atomic vapor or gas at the wave length or wave lengths of the resonance line or lines; and converting a substance to be analyzed into a sample atomic vapor or gas representative in elemental composition of said substance, said sample vapor or gas being formed in the path of the radiation so that the degree of absorption of the resonance line or lines thereby can be determined.

Preferably, but not essentially, the method comprises the steps of: introducing a solution or dispersion of the substance to be analyzed into a flame so as to convert said substance into a representative sample atomic vapor or gas in said flame; generating spectral radiation containing the resonance line or lines characteristic of the element for which analysis is to be performed; generating a reference atomic vapor of said element; directing said radiation through the flame and the sample atomic vapor or gas therein and onto the reference atomic vapor or gas; and detecting the intensity of the resonance line or lines re-emitted by the reference atomic vapor or gas.

It is preferred that the reference gas or vapor is generated in a partial vacuum by electrical means; either by an electrical discharge giving rise to cathodic sputtering or by electrically heating a body of the element concerned.

The invention is also concerned with apparatus for use in spectrochemical analysis comprising: a spectral lamp for generating radiation including the resonance line or lines characteristic of a given element for which an analysis is to be performed; means for converting the substance to be analyzed into a sample atomic vapor or gas representative of said substance; a resonance lamp for generating a reference atomic vapor or gas of said given element; and photoelectric detector means associated with said resonance lamp to detect the intensity of radiation emanating therefrom; the arrangement being such that when the apparatus is in use, radiation is directed from the spectral lamp onto the reference atomic vapor or gas and resonance radiation re-emitted by the reference atomic vapor or gas is directed to said photoelectric detector means, the atomizing flame being interposed in the radiation path between the spectral lamp and the photoelectric detector means.

Preferably, the resonance lamp is a partially evacuated envelope in which the reference atomic vapor or gas is produced by cathodic sputtering or thermally by electric heating.

It is preferred that the means for converting the substance to be analyzed into the sample atomic vapor or gas consists of a burner for producing an atomizing flame having provision for introducing a solution or dispersion of the substance into the flame so that a sample atomic vapor or gas is generated in the flame.

It should be understood that reference throughout this specification to a given element is intended to include reference to any isotope of that element. It is possible by application of the techniques and apparatus of the present invention to distinguish between different isotopes of the same element and to determine their relative proportions.

Further, it will also be appreciated that although a number of steps have been listed in order to define the method of the present invention, this is done to name the essential steps rather than to imply any particular sequence in which the steps must be performed.

Although it is possible, in accordance with the principles of the present invention, to place the atomizing flame between the resonance lamp and the detector, this will, in general, be less desirable than placing the atomizing flame between the spectral lamp and the resonance lamp since the light emitted by the flame itself can swamp the photoelectric detector. Nevertheless, it is sometimes possible to select the form of atomizing flame and substance for analysis so that extraneous radiation from the flame is reduced to a minimum and the former configuration can be employed. In such an event, the invention envisages the combination of the resonance lamp and the spectral lamp in the one envelope.

It should be noted that resonance radiation from the atomizing flame itself will be negligible since most of the excited atoms in the flame dissipate their energy by collision or other means which do not result in the emission of resonance radiation. In the resonance lamp, the rarefied atmosphere ensures that excited atoms can radiate at the resonance wave lengths before their energy is dissipated by collision.

Another possibility envisaged by the present invention is the use of multi-element spectral lamps and multi-element resonance lamps together, if necessary, with a variety of simple optical or interference filters so that simultaneous analyses can be performed or, at least, so that different analyses can be performed with the one pair of lamps.

In order to further portray the nature of the present invention, specific apparatus will now be described by way of example and illustration only. In the following description reference will be made to the accompanying drawings in which.

Figure 1:
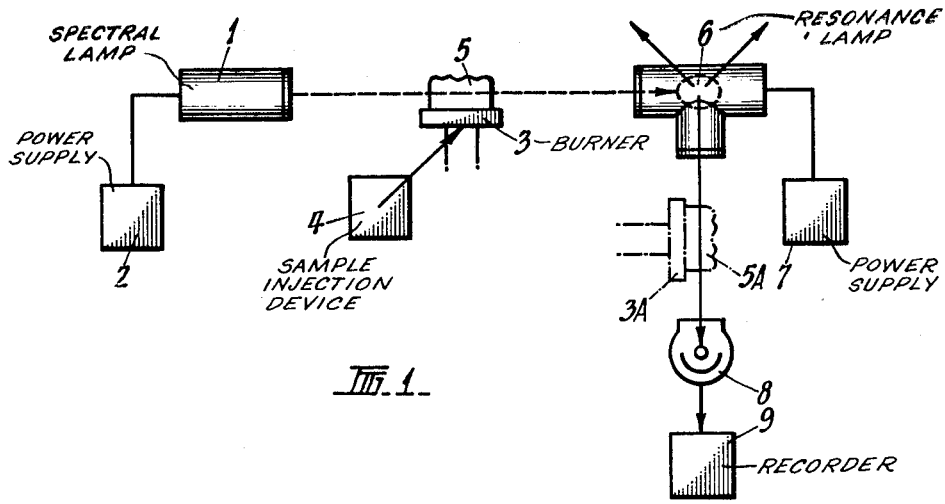
FIGURE 1 is a schematic diagram illustrating the principles of the present invention.

Referring firstly to FIGURE 1, the apparatus comprises a spectral lamp 1 and its associated power supply 2; a burner 3 and the associated sample injecting device 4; a resonance lamp 6 with its associated power supply 7; a photoelectric detector 8 and associated power and/or amplifying circuitry and indicating and/or recording means generally indicated at 9.

The spectral lamp 1 is one which produces radiation characteristic of, and including the resonance line or lines of, the element for which analysis is to be made. The resonance lamp 6 is one which produces a vapor of the same element.

In operation, the radiation from the spectral lamp 1 passes through the flame 5 of the burner 3 and thence into the resonance lamp 6. A solution or dispersion of the substance to be analyzed is introduced into the flame 5 from the injecting device 4 and the atomic vapor of the element to be analyzed which is thus formed in the flame 5 causes absorption of the resonance line or lines in the radiation from the lamp 1. Resonance radiation thereby produced in the vapor within the lamp 6 is emitted in all directions, a portion of this radiation falling on the photoelectric detector 8, whereby its intensity is detected, measured, indicated and/or recorded by the means 9.

By removing the flame 5 from the radiation path or more preferably by discontinuing the supply of the test solution or dispersion to the flame, a "blank" can be obtained so that an absolute measurement of the radiation absorbed by the element in question can be made.

The spectral lamp 1 is preferably of the hollow cathode type, particularly a high intensity spectral lamp of the type described in our patent application Ser. No. 314,350, which also describes the requirements of the power supplies for the lamps.

The burner 3 may be of any suitable known type, most preferably of the type in which the flame is produced as a relatively long and thin sheet from a slit. The sample injection means 4 are also of known type.

An alternative position for the burner and hence the flame is shown at 3A by means of dashed lines. This configuration has already been discussed above.

The resonance lamp 6 may be of the type described in our copending patent application Ser. No. 372,772, or a lamp of the thermal type to be described hereinafter.

The photoelectric detector 8 may be of any suitable known type of photoconductive or photoemissive tube of photosensitive semiconductor device, the associated circuitry and other equipment (9) being chosen to suit the device employed.

Provision may also be made for modulating the power supplied to the spectral lamp 1 so as to produce a modulated beam of radiation therefrom. The resonance radiation from the resonance lamp 6 is thus also modulated and by using synchronous detection circuitry in conjunction with the photoelectric detector 8, which only responds to the modulated signal, the effects of any radiation from the flame can be eliminated. Of course, a mechanical "chopper" system can be similarly employed.

Filters may be interposed between the spectral lamp 1 and the flame and/or between the flame and the resonance lamp 6 in order to eliminate or minimize the effect of radiation of unwanted character, particularly when multi-element spectral lamps and/or resonance lamps are used (as will be described hereinafter).

Figure 2:
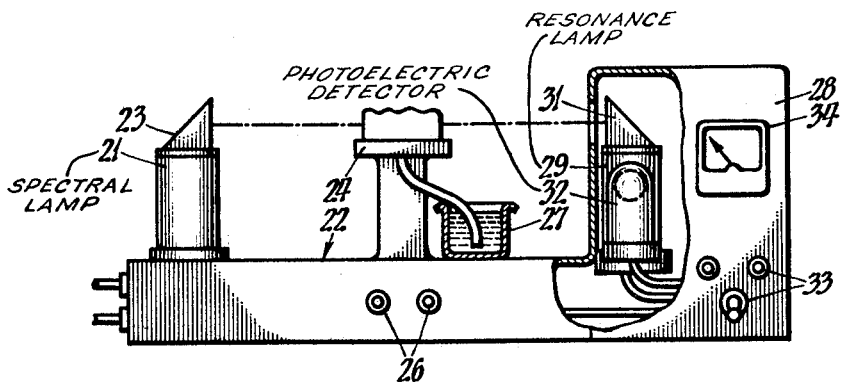
FIGURE 2 is an elevation, partly cut away, of a form of apparatus embodying the principles of the present invention.
Figure 3:
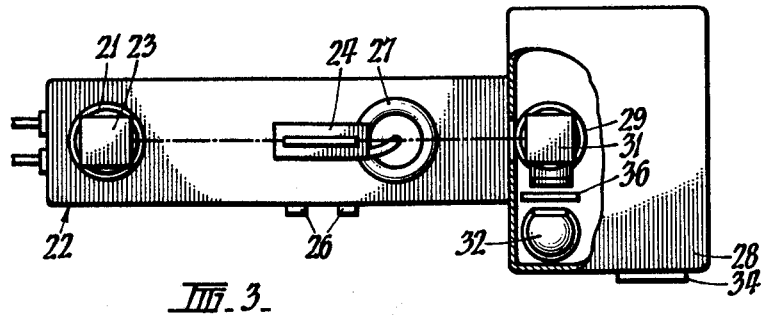
FIGURE 3 is a plan view of the apparatus of FIGURE 2 also shown partly cut away.

FIGURES 2 and 3 show a form of practical apparatus unit embodying the principles shown in FIGURE 1. In this apparatus, the spectral lamp 21 is mounted at one end of a type of "optical bench" 22. The beam from the lamp is initially directed vertically upwards and is reflected into a horizontal direction by a prism 23. The burner and sample injection means 24 is also mounted on the bench 22 and its associated controls 26 are mounted in the body of the apparatus below the bench 22. Space may be provided on the bench 22 as shown for a container 27 for the solution to be analyzed.

A further housing 28 at the end of the bench 22 remote from the spectral lamp 21 houses the resonance lamp 29 (which has a further prism 31 to deflect the radiation from prism 23 vertically downwards into the resonance lamp), the photoelectric detector 32, the power supplies (not shown) for the lamps 21 and 29 and the circuitry for the detector 32. The controls 33 for the lamps and detection circuitry and the meter 34 of the detection circuitry are mounted on the outside of the housing 28.

The operation of the apparatus of FIGURES 2 and 3 is essentially the same as described with reference to FIGURE 1. By way of further explanation, however, operation of the apparatus will be described with reference to a method for the determination of calcium and magnesium in, for example, the analysis of blood serum. For this purpose, the spectral lamp 21 is arranged to produce the atomic spectra of both calcium and magnesium simultaneously, that of calcium containing a single resonance line at 4226A and that of magnesium containing a single resonance line at 2852A. Similarly, the resonance lamp 29 is arranged to produce simultaneously the atomic vapors of both of these elements.

To perform the analysis, a suitably diluted solution of the serum to be analyzed is placed in the container 27 from which it is injected into the flame 25 of the burner 24. Both the calcium and magnesium resonance lines are absorbed by the vapors of these elements thus produced in the flame, and the total amount of absorption is detected by the detector 32 and indicated on the meter 34. From similar absorption measurements on standard and blank solutions, the amount of calcium and magnesium in the sample can be found. In order to measure the separate concentrations of the calcium and magnesium, it is necessary to eliminate one or the other of the resonance lines from the radiation falling on the detector. This can be easily effected (because of the wide separation of the lines) by means of a suitable optical filter 36 inserted between the resonance lamp 29 and the detector 32. By the alternate use of two filters, both calcium and magnesium can be analyzed individually.

If desired, simultaneous determination of calcium and magnesium can be achieved by the use of a further filter and photocell on the other side of the resonance lamp. This technique, however, is generally only satisfactory where the elements concerned have similar absorptions in the solution, otherwise accurate results will only be obtained when different solution concentrations are made up to give the appropriate absorptions.

Figure 4:
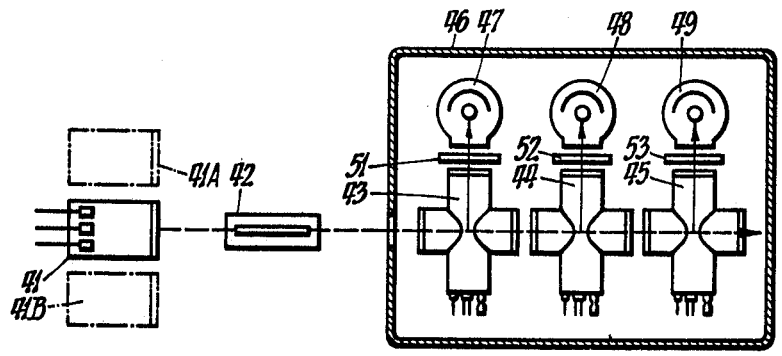
FIGURE 4 is a diagrammatic representation of one possible arrangement of an apparatus for use in multi-element analyses.

FIGURE 4 shows diagrammatically one manner in which the apparatus of FIGURE 1 or FIGURES 2 and 3 can be modified for multi-element analyses. As shown in FIGURE 4, a single multi-element spectral lamp 41 is used to produce radiation containing the resonance line of a number of different elements, in this case three. After passage through the flame, produced by the burner 42 as before, the radiation passes through a series of resonance lamps 43, 44, 45 which are contained in a housing 46. Each of the lamps 43, 44, 45 produces an atomic vapor of one of the elements which is to be analyzed and whose spectrum is produced by the spectral lamp. Each resonance lamp 43, 44, 45 has associated with it a photoelectric detector 47, 48, 49, each of which in turn has its own associated circuitry. Thus, it is possible using such an apparatus to carry out analyses for three different elements in the same substance at the same time.

Filters 51, 52, 53 may be used if necesary to ensure that no resonance radiation except the selected one reaches the detectors.

Alternatively, the resonance lamps 43, 44, 45 may themselves be multi-element lamps producing the atomic vapor of more than one element, in which case, as explained earlier, the filters 51, 52, 53 become essential.

A further alternative involves the use of one or more further spectral lamps 41A, 41B which may, along with lamp 41, be single element lamps or multi-element lamps and which may be substituted for lamp 41 to enable further analyses or sets of analyses to be carried out.

Figure 5:
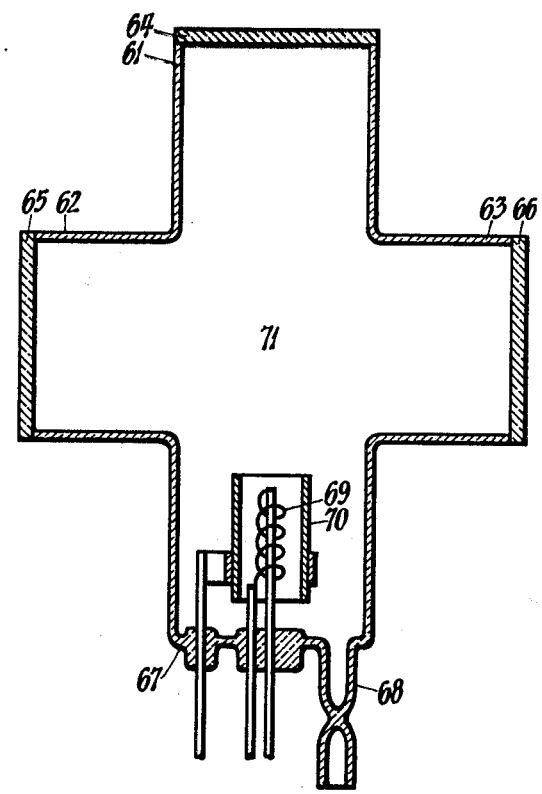
FIGURE 5 is a longitudinal section of a typical thermal resonance lamp suitable for use in a connection with the present invention.

FIGURE 5 illustrates a form of resonance lamp which is particularly useful in the practice of the present invention. The lamp comprises a generally cylindrical glass envelope 61 with two diametrically opposed side arms 62, 63. One end surface 64 of the envelope and the end surfaces 65, 66 of the side arms 62, 63 serve as windows for radiation to enter or leave the envelope. The assembly for producing the atomic vapor is mounted and sealed in the other end surface 67 of the envelope which also accommodates an evacuating passage 68. The assembly comprises a filament 69 of known type which is adapted to be heated electrically and which is surrounded by, but insulated electrically from, a tube 70 which is made wholly or partly of the element, the vapor of which is to be produced by the lamp.

The lamp is prepared for use by evacuating the envelope through the passage 68 to a pressure of the order $10^{-6}$ torr and carrying out the normal "outgassing" and other conditioning procedures and then filling the envelope with an inert gas at low pressure, preferably argon at about 3 mm. Hg pressure, prior to sealing the passage.

In use, a current is passed through the filament 69, thus heating the surrounding tube 70 and thereby producing a cloud of atomic vapor of the element comprising the tube in the space 71. The temperature of the tube 70 is adjusted to provide maximum emission of resonance radiation from the lamp when in operation.

Generally, only the resonance radiation emerging from one of the windows 64, 65, 66 is utilized, the function of the other side arm and window being to prevent scattered radiation being reflected from the walls of the envelope 61 and out through the window in use.

In a modified resonance lamp, two or more different atomic vapors may be produced within the one envelope, either by using a tube comprising an alloy of the elements concerned or by providing a tube of each element, each with its own heating filament. In this way, one resonance lamp may be used as a detector of the resonance lines of two or more elements either individually or in combination, as described above.

The techniques and apparatus described above, because of their simplicity, have proved to be very valuable and useful in atomic absorption spectrophotometry but are also available in other kinds of spectroscopic work. It is thus considered that they constitute a worthwhile improvement over the known prior art in this field. Nevertheless, there are many modifications and additions to the above examples which can be made by those skilled in the art without departing from the spirit of the invention. For example, lenses can be employed to direct or focus radiation from the spectral lamp onto the plane and thence onto the reference vapor. Similarly, the resonance radiation from the resonance lamp can be focused onto the photoelectric detector.

What is claimed is:

1. In an atomic absorption spectrophotometer, a spectral lamp for generating radiation including the resonance line or lines characteristic of a given element for which an analysis is to be performed, a resonance lamp comprising a multi-armed vapor generating tube having a window in one end and vapor generating means for generating a reference atomic vapor of said given element in the opposite end in line with said spectral lamp to define a first radiation path and a side arm with a window in one end thereof extending normal to said first path of radiation and in communication with the interior of said tube adjacent said vapor generating means, photoelectric detector means disposed in line with said side arm window to receive the resonance radiation re-emitted by said reference atomic vapor to define a second radiation path, means connected to said photoelectric detector to indicate the intensity of the radiation incident thereon, and means for converting the substance to be analyzed into a sample atomic vapor representative of said substance disposed in one of said radiation paths.

2. In an atomic absorption spectrophotometer as set forth in claim 1 wherein said means for converting the substance to be analyzed into a sample atomic vapor is disposed in said first path of radiation between said spectral lamp and said multi-armed vapor generating tube.

3. In an atomic absorption spectrophotometer as set forth in claim 1 wherein said means for converting the substance to be analyzed into a sample atomic vapor is located in said second radiation path between said multi-armed vapor generating tube and said photoelectric detector means.

References Cited

UNITED STATES PATENTS

| | | | |
|---|---|---|---|
| 2,419,128 | 4/1947 | Evans | 313—212 X |
| 2,847,899 | 8/1958 | Walsh. | |
| 3,286,119 | 11/1966 | Sugawara et al. | 313—185 X |

FOREIGN PATENTS 1,400,770  4/1965  France.

FOREIGN PATENTS

David: Recent Developments in Atomic Absorption Analysis, Spectrochimica Acta, vol. 20, 1964. pp. 1185–1195.

RONALD L. WIBERT, Primary Examiner

F. L. EVANS, Assistant Examiner

U.S. Cl. X.R.

250—43.5, 83.3, 218, 226; 356—51. 87. 96. 187